Feb. 10, 1959
C. P. MICHLEIN
2,872,765
APPARATUS FOR MEASURING QUANTITIES OF SMALL ARTICLES AND PACKAGING SAME
Filed Jan. 12, 1955
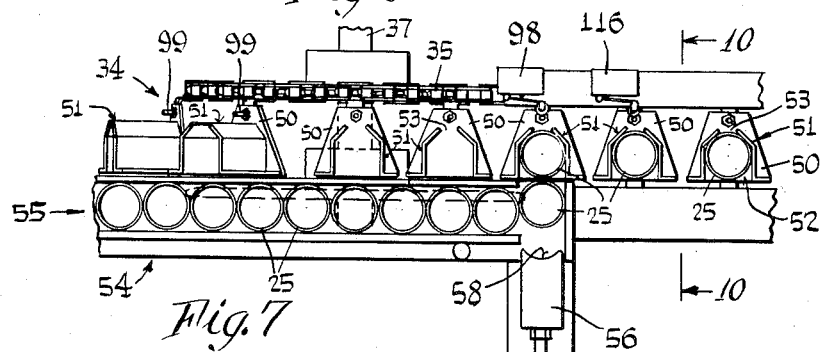
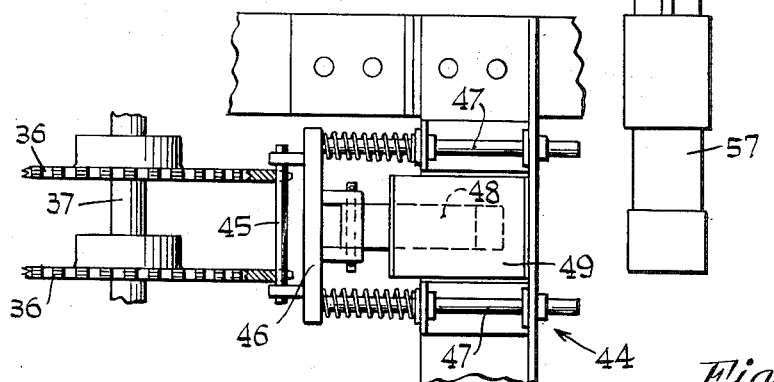
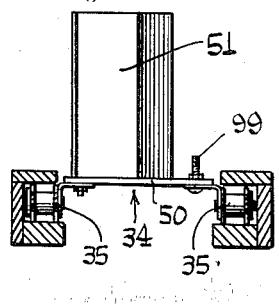
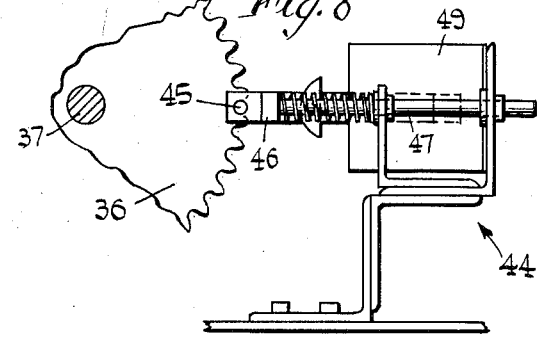
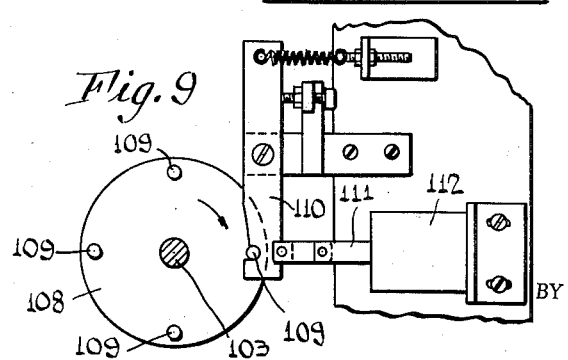
INVENTOR
Carl P. Michlein
BY
Johnson and Kline
ATTORNEYS Feb. 10, 1959     C. P. MICHLEIN     2,872,765
APPARATUS FOR MEASURING QUANTITIES OF
SMALL ARTICLES AND PACKAGING SAME
Filed Jan. 12, 1955     7 Sheets-Sheet 5
*Fig. 11*
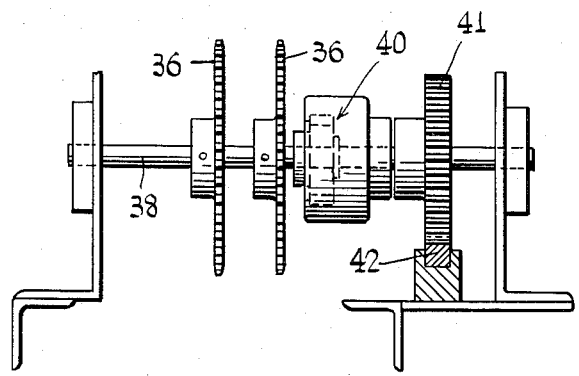
*Fig. 12*
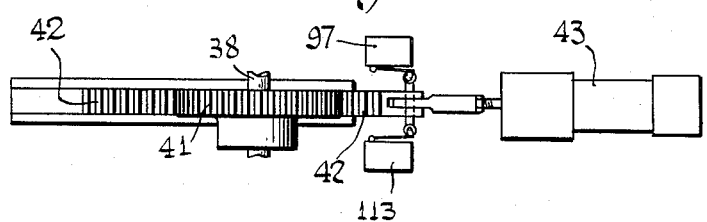
*Fig. 19*
*Fig. 18*     *Fig. 17*
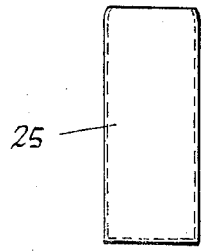 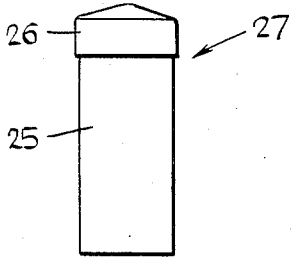
INVENTOR
Carl P. Michlein
BY Johnson and Kline
ATTORNEYS

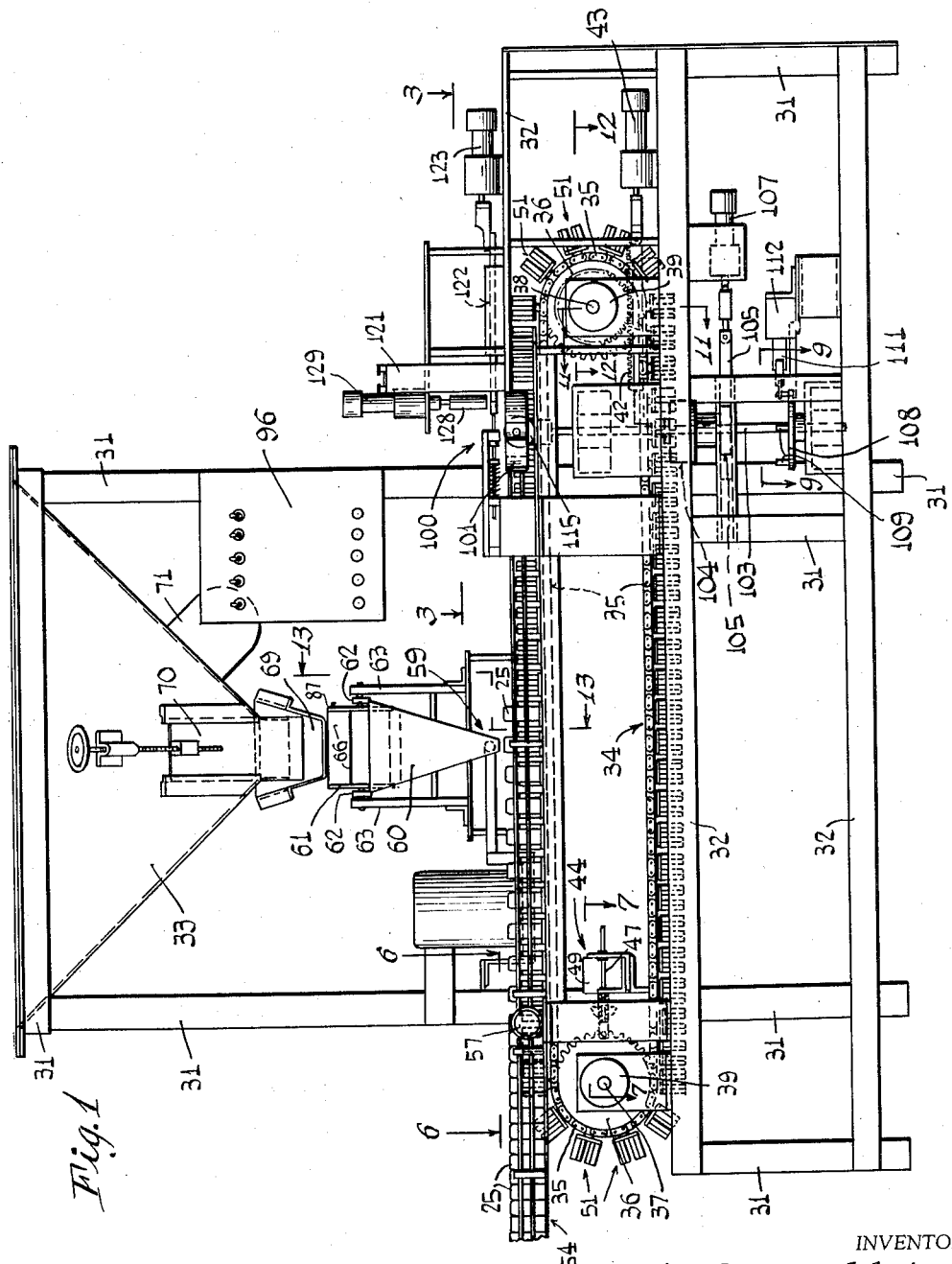

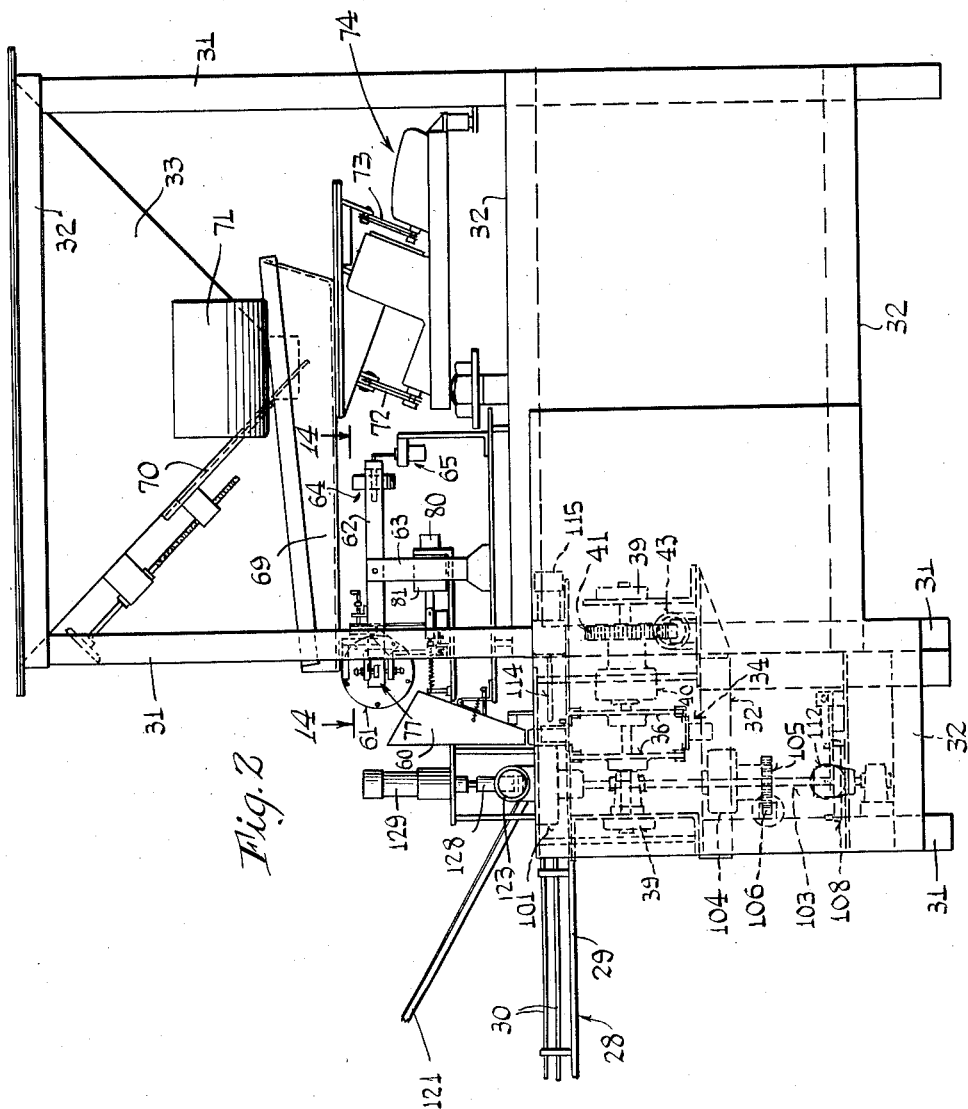

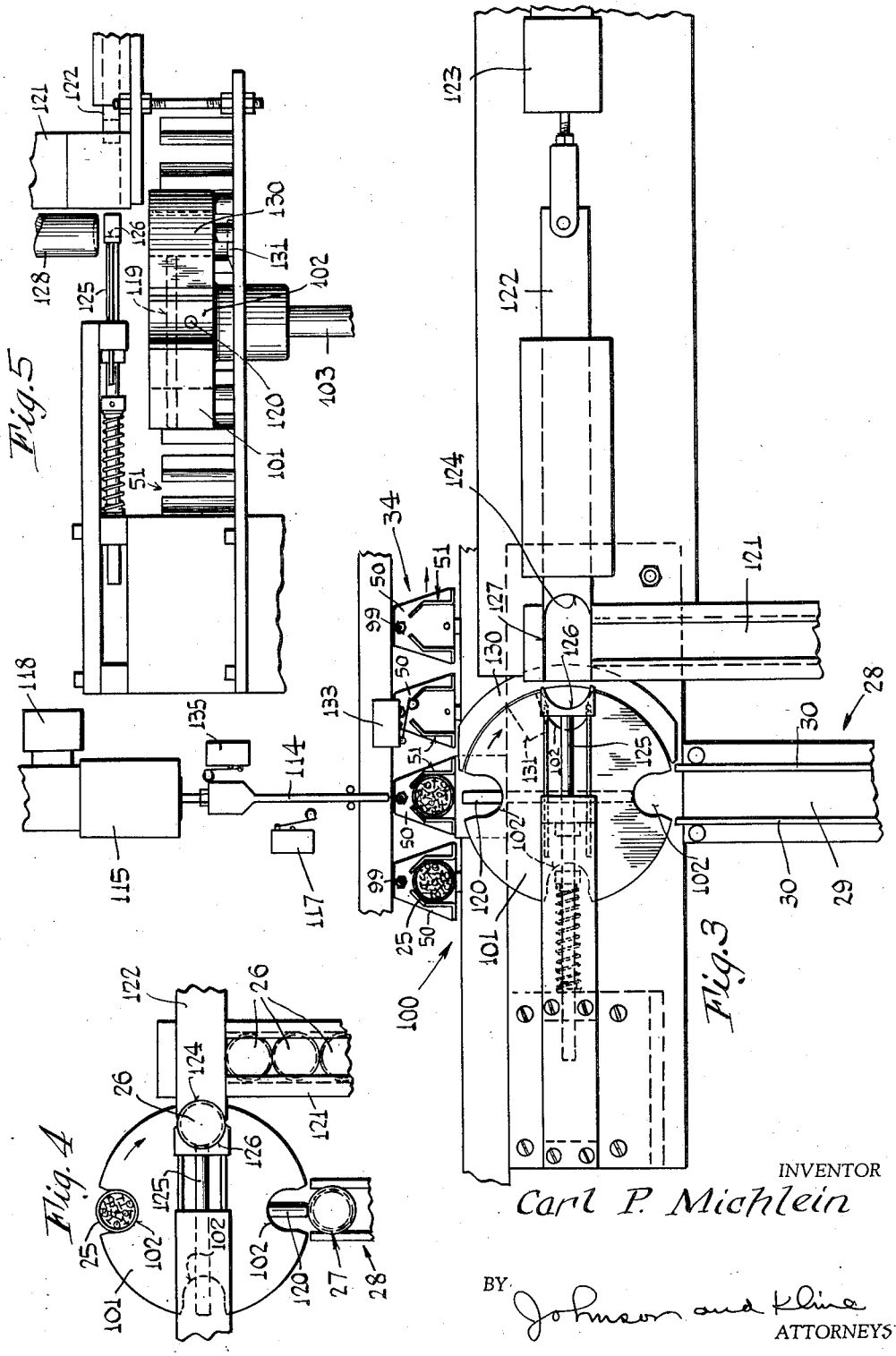

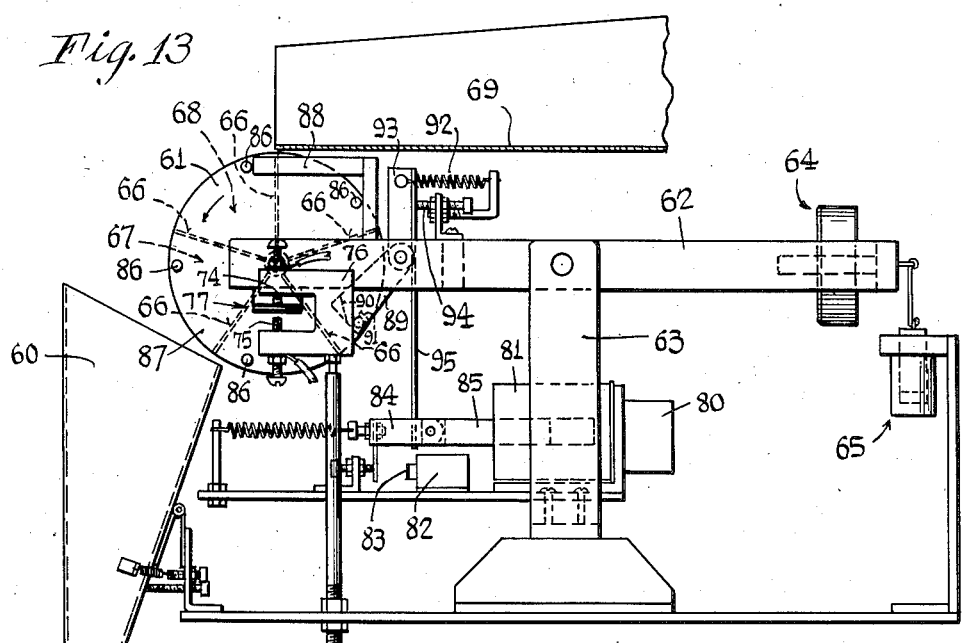
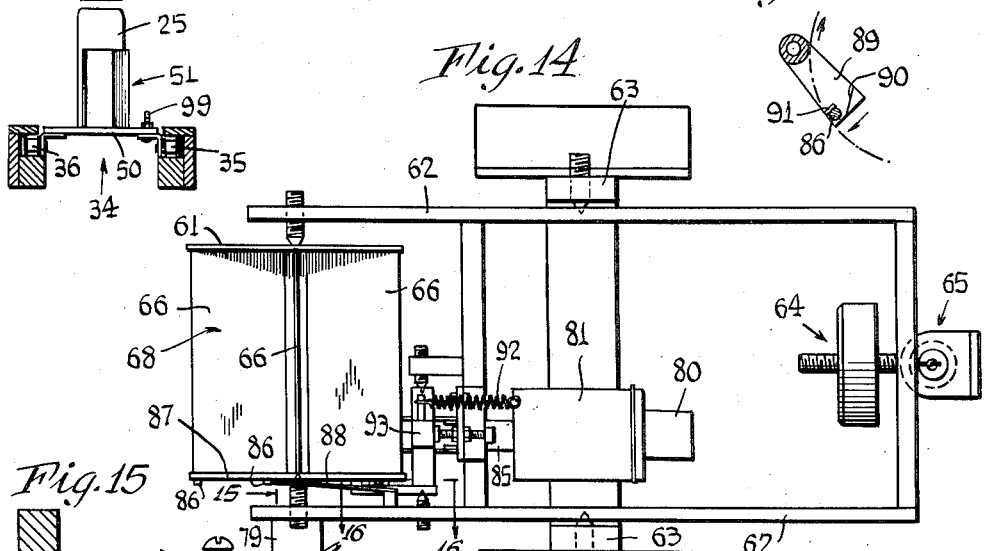
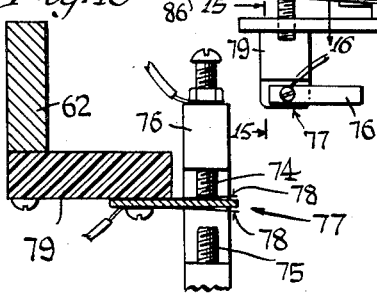

United States Patent Office 2,872,765
Patented Feb. 10, 1959

2,872,765

APPARATUS FOR MEASURING QUANTITIES OF SMALL ARTICLES AND PACKAGING SAME

Carl P. Michlein, Shelton, Conn., assignor to The Shelton Tack Company, Shelton, Conn., a corporation of Connecticut Application January 12, 1955, Serial No. 481,361

15 Claims. (Cl. 53—64)

This invention relates to the art of measuring and packaging quantities of small articles.

The invention is illustrated and described herein in connection with the measuring of small nails, cut tacks and the like, and the placing of the measured quantities in containers which are closed by caps; however, it should be understood that the invention is not limited to the specific apparatus and method set forth herein, but instead is to be considered in the light of the appended claims.

An object of the invention is to provide a novel and improved method, and a fully-automatic, labor-saving apparatus for measuring predetermined quantities of small articles, loading said quantities into packages, applying closures to the packages, and transferring the loaded and closed packages to a delivery point.

Another object of the invention is to provide an improved apparatus and method as above set forth, which is characterized by a relatively high rate of production.

A further object of the invention is to provide an improved apparatus and method as above outlined, by which very accurate measurements of the quantities involved may be had.

A still further object of the invention is to provide an improved apparatus of the type mentioned, which is capable of handling a large variety of different materials or articles.

Yet another object of the invention is to provide an improved packaging apparatus in accordance with the above, which is extremely reliable and non-critical in its operation.

A feature of the invention resides in the provision of an improved packaging apparatus as described above, which is simple in construction, relatively small and compact, and economical to fabricate.

Another feature of the invention resides in the provision of a novel and improved apparatus in accordance with the foregoing, which is simple and safe to operate, and has readily-accessible components which are easy to service and are not likely to wear out quickly.

Other features and advantages will hereinafter appear.

In the accompanying drawings:

Figure 1 is a front elevational view of a measuring and packaging apparatus made in accordance with the invention.

Fig. 2 is a right side elevational view of the apparatus shown in Fig. 1.

Fig. 3 is a fragmentary plan view of the package-capping and transfer mechanism of the apparatus, this view being taken as indicated by the arrows 3—3 of Fig. 1.

Fig. 4 is a fragmentary plan view of a portion of the mechanism shown in Fig. 3, illustrating the cap transfer operation preparatory to a package being capped.

Fig. 5 is a fragmentary front elevational view of the mechanism of Fig. 3.

Fig. 6 is a fragmentary plan view of a portion of the apparatus shown in Fig. 1, illustrating the mechanism for transferring packages to the apparatus, the view being taken in the direction of the arrows 6—6 of Fig. 1.

Fig. 7 is a fragmentary plan view of a sprocket-wheel locking mechanism of the apparatus of Fig. 1, the view being taken in the direction of the arrows 7—7 of this figure.

Fig. 8 is a fragmentary front elevational view of the sprocket locking mechanism of Fig. 7.

Fig. 9 is a fragmentary plan view of a dial-locking mechanism of the apparatus of Fig. 1, the view being taken in the direction of the arrows 9—9 of this figure.

Fig. 10 is a fragmentary vertical sectional view taken on line 10—10 of Fig. 6.

Fig. 11 is a fragmentary vertical sectional view taken on line 11—11 of Fig. 1.

Fig. 12 is a fragmentary plan view of an indexing mechanism of the apparatus of Fig. 1, the view being taken as indicated by the arrows 12—12 of this figure.

Fig. 13 is a fragmentary sectional and elevational view taken on the line 13—13 of Fig. 1.

Fig. 14 is a fragmentary plan view of the article measuring and loading mechanism of the apparatus of Figs. 1 and 2, the view being taken as indicated by the arrows 14—14 of Fig. 2.

Fig. 15 is a fragmentary vertical sectional view of a contact mechanism, taken on line 15—15 of Fig. 14.

Fig. 16 is a fragmentary vertical sectional view taken on line 16—16 of Fig. 14.

Figs. 17, 18 and 19 are respectively a side elevational view of a capped package, and side elevational views of a package and a cap, of the type used by the method and apparatus of the invention.

Figure 20:
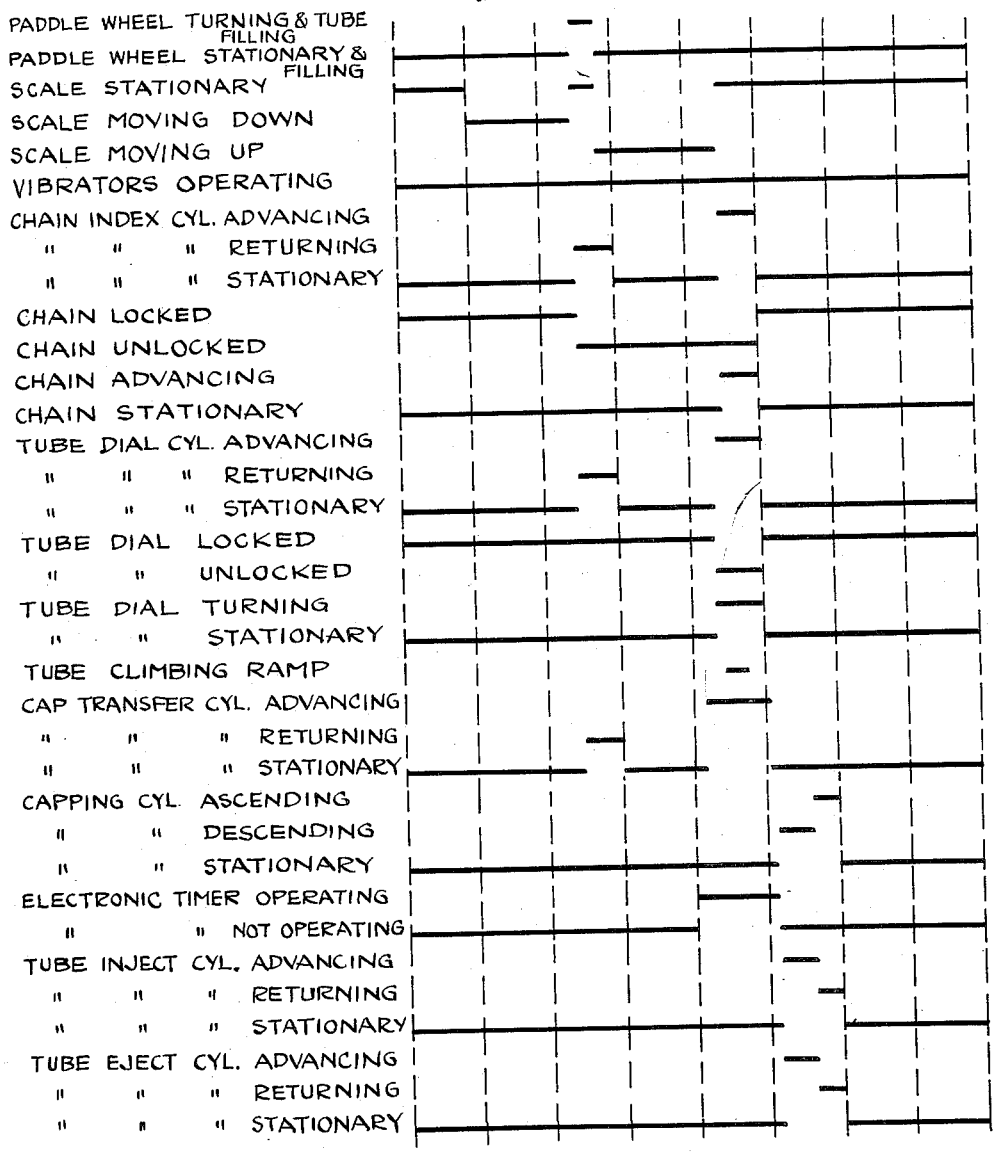
Fig. 20 is a chart showing the sequence of operations of various components of the apparatus.

The apparatus of the invention as shown in the various figures of the drawings is adapted to automatically measure quantities of small nails, tacks or brads, and to deposit these in small tubular containers such as the container 25 shown in Fig. 18. The apparatus then applies caps 26, Fig. 19, to the filled containers 25, producing the completed package 27 shown in Fig. 17, and transfers the completed package to a delivery point from which it may be removed by the operator.

In Figs. 2 and 3, at the delivery or ejection point there is a guide 28 having a bottom member or track 29 and side rails arranged to accommodate a number of the containers 27 in a single line, the containers being ejected along the guide 28 from right to left (as viewed in Fig. 2).

The guide 28 and the other components and mechanisms of the apparatus are carried in general by an iron frame comprising various upright members 31 and horizontal members 32. Certain of the upright members 31 extend upward beyond the machine proper and together with some of the horizontal members 32 support a bin or hopper 33 in which the small articles which are to be measured and packaged are deposited in large quantities.

Referring to Figs. 1, 2, 6, 7, 10 and 11, an endless chain-type carrier 34 is provided for the packages or tubes 25 which are to be filled and capped, said carrier comprising a pair of endless chains 35 extending around paired sprocket wheels 36 carried by shafts 37 and 38 which are turnable in bearings 39 carried by the framework of the apparatus. The shaft 37 is not driven, but instead may turn freely; the shaft 38, Fig. 11, has a ratchet drive 40 connected to a spur gear 41 which is engaged by a rack 42 adapted to be driven by a hydraulic cylinder and piston 43 (Fig. 1). By this construction, reciprocation of the rack 42 as effected by the chain cylinder and piston 43 may be made to advance or index the carrier 34 with a stepped movement, the direction in the present instance being from left to right for the top portion of the carrier as viewed in Fig. 1, occasioned by clockwise turning of the sprockets 36.

Coordinated with the operation of the piston and cylinder 43 is a chain or carrier-locking mechanism 44, Figs. 1, 7 and 8, said mechanism comprising a bar 45 arranged to engage the teeth of the paired sprockets 36. The bar 45 is carried by a yoke 46 mounted on spring-charged plungers 47, said yoke being connected with an armature 48 of a solenoid 49. When the solenoid 49 is energized it will withdraw the locking bar 45 from the sprocket wheels 36, permitting unrestrained movement of said wheels; when the solenoid 49 is deenergized, the spring-charged plunger 47 will hold the locking bar in engagement with the sprocket wheels, accurately positioning the latter and the carrier 34 in predetermined positions according to the pitch of the wheels, and preventing movement thereof.

The carrier 34 for the tubes 25, see Fig. 10, further comprises cross strips 50 secured to and extending between the chains 35, and nests 51 carried by the cross strips 50. The nests 51 have oppositely disposed, large and small side openings 52 and 53 respectively, the large openings 52 being of a size to readily pass the tubes 25 and the small openings 53 being too narrow to pass the tubes 25. Preferably the nests 51 are arranged to frictionally hold the tubes 25 with a slight pressure when the latter are inserted therein.

In Figs. 1 and 6 there is shown a mechanism by which the empty tubes 25 are fed and transferred or "injected" one at a time to the nests 51 of the carrier 34. From a means of supply, the tubes 25 are fed to a guide 54 which maintains them in a single line, the direction of movement of the tubes being indicated by the arrows 55. The tubes 25 are normally maintained under a slight continuous force, tending to move them from left to right, as viewed in Fig. 6. A transfer mechanism is provided, comprising a plunger 56 operated by a hydraulic injecting cylinder and piston 57, the plunger 56 having a concave end 58 adapted to engage the side cylindrical surfaces of the tubes 25. Reciprocation of the plunger 56 will thus cause transfer of the tubes respectively to the nests 51, provided that the tube carrier 34 is indexed or advanced properly from left to right and provided that such indexing is correlated with the actuation of the plunger.

In Fig. 6 it will be seen that the stepped or indexing movement of the carrier 34 should be the equivalent of the distance between five teeth of the sprocket wheels 36, measured along the pitch circle, in order for an empty nest 51 to be presented each time in the appropriate position to receive the next tube 25 from the guide 54. That is, the amount of advance of the carrier 34 should be equal to five times the pitch or distance between adjacent teeth of the sprocket wheels 36, and accordingly the positioning and locking mechanism 44 shown in Figs. 7 and 8 will be operative to cause the locking bar 45 to engage every fifth recess between the teeth of the paired sprockets 36. Accurate positioning and indexing of the tube carrier 34 is thus provided for.

After the tubes 25 have been deposited one by one in consecutive nests 51 of the carrier 34 they are advanced to a filling or loading station, indicated generally by the numeral 59 in Fig. 1, where the desired quantity of articles is deposited in the tubes. At the filling station 59 a funnel 60 is provided, having its lower small end so positioned as to be centered over the openings in the tubes 25 as the latter are positioned one at a time at the filling station.

A predetermined quantity of the articles from the bin 33 is periodically deposited in the funnel 60 from a paddle wheel 61, Figs. 1, 2, 13 and 14, said paddle wheel being pivotally carried by a rectangular balance frame 62 constituting a balance scale, which is pivotally mounted on uprights 63 secured to the framework of the apparatus. The frame 62 has an adjustable counterweight 64 and is connected to a dash pot 65 which restrains it slightly from having unrestricted or wholly free movement, and prevents bouncing or vibration of the frame.

As shown in Fig. 13, the paddle wheel 61 has five compartments, formed by five radial partitions 66, being so ararnged that a lower left component 67, Fig. 13, is emptying into the funnel 60 at the same time that an upper left compartment 68 is in position to receive a charge of articles from a chute 69. As seen in Fig. 2 the chute 69 has articles deposited on it from the bin 33, the rate of discharge being controlled by a shutter 70, in conjunction with a vibrator 71 mounted on the lower portion of the bin. The chute 69 is also agitated or vibrated, by means of linkages 72 and 73 and a vibrator 74a.

The frame 62 functions as a sensitive balance, and when a predetermined quantity of the small articles from the chute 69 has been deposited in the compartment 68 the frame 62 will swing counterclockwise as viewed in Fig. 13 a slight amount. This movement is utilized to cause the paddle wheel 61 to be turned counterclockwise through one-fifth revolution, whereupon the filled compartment 68 will be shifted to the position of the compartment 67 shown in Fig. 13, causing its contents to be wholly discharged into the funnel 60.

To accomplish the rotation of the paddle wheel 61, upper and lower stationary electric contacts 74 and 75 are provided, carried by a C-shaped block 76, said contacts being engageable by a movable contact 77 having resilient leaf-spring faces 78, the movable contact 77 being mounted on an insulating arm 79 secured to the frame 62. The contacts 74, 75 and 78 control energization of an electric relay 80 and solenoid 81, the latter motivating the paddle wheel 61 and the relay 80 acting in conjunction with the solenoid to cause momentary actuation thereof in spite of longer intervals of closing of the contacts. Also included in the circuit of the contacts, relays and solenoid is a limit switch 82 which is actuated by a lever 83 connected to a spring-charged plunger 84 operated by the armature 85 of the solenoid 81.

Referring to Figs. 13 and 14, the paddle wheel 61 has five lugs 86 equispaced around the peripheral portion of one side plate 87 of the wheel. A leaf spring 88 is mounted for engagement with the lugs 86 to provide a back check and prevent clockwise movement of the wheel, as viewed in Fig. 13, when a lug 86 is engaging the spring 88. As shown in Figs. 13 and 16, a camming driving connection comprising a cam arm 89 having a cam projection 90 and an abutment or stop projection 91 is pivotally carried by the frame 62 and spring-charged by a helical extension spring 92 which maintains an upward extension 93 of the cam arm in engagement with an adjustable stop 94. The extension 93 carries an actuator member 95 which is operatively connected to the plunger 84 to be actuated thereby.

Considering Fig. 13 it will be seen that when the solenoid 81 is energized it will cause a rapid counterclockwise movement of the cam arm 89, causing the cam 90 thereof to strike a lug 86 on the paddle wheel, providing an initial counterclockwise impetus to the wheel. This impetus, combined with the load in the compartment 68, will cause counterclockwise turning of the wheel, and the extent of turning will be limited to one-fifth revolution by quick return of the cam arm 89 to the position shown, wherein the abutment 91 thereof will arrest the next lug 86 of the paddle wheel. Thus the filled compartment 68 will dump its contents into the funnel 60.

The relay 80 is of the cocking or holding type, being adapted to remain in either open-circuit or closed-circuit position, depending on how it was last actuated. This action may be readily accomplished by use of holding contacts, as is well understood in the art.

When the movable contact 77 engages the upper stationary contact 74 during the raised position of the paddle wheel 61, the relay 80 is cocked and held by the holding contacts in closed-circuit position, wherein it connects the solenoid to the lower contact 75 so as to be ready to operate upon closing of the circuit through said contact. When the paddle wheel 61 descends under the weight of the articles deposited in the compartment 68, it causes the movable contact 77 to engage the lower stationary contact 75 and close a circuit therethrough. This now energizes the solenoid 81 and causes the latter to give the paddle wheel 61 a counterclockwise impetus. During such operation, however, the limit switch 82 which is in series with the coil of the relay 80 is opened, deenergizing the relay and causing it to open the circuit of the solenoid 81. The interval of energization of the solenoid is therefore brief. Thus the camming arm 89 is quickly returned after being actuated, in time to arrest the next succeeding lug 86 and limit the turning of the paddle wheel 61 to one-fifth revolution. Also, the energization of the solenoid 81 will be controlled through the relay 80 and caused to occur momentarily only at definite intervals as determined by the cycling up and down movements of the paddle wheel 61, specifically only at the termination of the down movements thereof.

The provision of the dash pot 65 and the leaf spring faces 78 on the movable contact 77 prevents bouncing of the frame 62 and erratic control of the solenoid and relay circuits by said contacts.

Energization of the relay 80 is utilized to trigger or start an adjustable electronic timer 96, Fig. 1, which in turn controls the indexing or advancing movement of the tube or package carrier 34. A short interval of time after the timer 96 is started, it will cause operation of the cylinder and piston 43 to advance the tube carrier 34 so as to present the next tube 25 at the filling station 29, such advance being well ahead of dumping of the next load by the paddle wheel 61.

The locking mechanism 44 for the tube carrier 34 was previously rendered inoperative or unlocked by energization of the solenoid 49 through closing of a switch 97, Fig. 12, effected during the return or left-to-right stroke of the indexing rack 42. In parallel with the switch 97 is a switch 98 actuated by screws 99 on the tube carrier 34. When the tube carrier 34 is stationary, the switch 98 is maintained open by a screw 99, but as soon as the carrier 34 starts its movement the switch 98 closes and takes over the function of the switch 97 which has been opened by the advancing or right-to-left movement of the rack 42 which effects the advance of the carrier 34. The advancing movement of the tube carrier 34 is then halted by actuation of the switch 98 by the next screw 99, the switch opening the circuit of the solenoid 49 and enabling the locking mechanism 44 to be operative. The subsequent closing of the switch 97 upon completion of an indexing cycle of the rack 42 will again release the locking mechanism 44, but this will not disturb the position of the tube carrier 34 since driving force has been removed therefrom and the inherent friction of the parts will prevent incidental creepage or displacement of the carrier.

It will be understood that with the above construction the filling of the tubes 25 is carried on at a given rate, and that by virtue of the electronic timer 96, which is actually part of a delayed action motive means comprising the unit 43, each time a tube is filled the indexing and lock mechanism for the tube carrier 34 will be actuated through one complete cycle, to bring the next unfilled tube 25 to the loading station 59. Thereupon, no further operation of the tube carrier 34 may be effected until first the measuring and filling mechanism goes through another cycle to fill the next advanced tube. Thus the measuring and filling operation in effect dictates to the remainder of the apparatus. Each time the electronic timer is started by the measuring and filling mechanism it will function to unlock and index the tube carrier as above described, and will thereafter cease to function until again started.

Upon repeated cycles of operation of the measuring and filling mechanism and the tube carrier 34 the filled tubes 25 will be carried to the right, as viewed in Fig. 1, to a transfer and capping or package-closing station 100.

Referring to Fig. 3 a small notched dial 101 is provided, having four notches or recesses 102 in its periphery, each arranged to accommodate a filled tube 25. The dial 101 is mounted with its axis vertical, as shown in Figs. 1 and 2, being carried by a shaft 103 having a ratchet drive 104 connected with a spur gear 105 which is in turn driven by a rack 106. The rack 106 is operated by a hydraulic cylinder and piston 107.

Below the gear 105 and rack 106 the shaft 103 carries a positioning wheel 108 having four pins 109 engageable by a notched spring-charged lever 110 adapted to lock the wheel 108 in any of four rotative positions. The lever 110 is connected to an armature 111 of a solenoid 112 to be actuated thereby.

By the above construction the transfer dial 101 is periodically turned clockwise, as viewed in Fig. 3, through a quarter revolution, thereby to enable it to transfer filled tubes 25 from the tube carrier 34 to the delivery guide means 28.

The indexing of the transfer dial 101 is effected as follows: The circuit of the solenoid 112 is controlled by the electronic timer 96 so that the solenoid is energized simultaneously with the initial movement of the tube carrier 34. However, the energization of the solenoid 112 is extremely short, being merely sufficient to release one of the lugs 109 and then quickly returning the lever 110 into normal position to arrest the next advancing lug 109. This is effected in the following manner.

In circuit with the solenoid 112 which locks the dial 101 is a switch 113, Fig. 12, which is normally closed during the rest periods of the tube carrier 34 but is opened shortly after the initial forward or advancing movement of the rack 42 by which the tube carrier 34 is advanced. Thus there is but a momentary energization of the solenoid 112, whereupon the opening of the switch 113 again deenergizes it. After release of the dial lock by deenergization of the solenoid 112, the dial 101 is advanced through a quarter of a revolution in a clockwise direction, this occurring during the advancing movement of the tube carrier 34 and being effected by activation of the piston and cylinder 107 which indexes the dial 101 simultaneously with the activation of the piston and cylinder 43 which indexes or advances the tube carrier 34. Both such activations are caused by the electronic timer 96.

It will be understood from the above that the tube transfer dial 101 and the tube carrier 34 have corresponding or coincidental periods of rest. During such periods a filled tube 25 is transferred from the carrier 34 to the dial 101 by an eject plunger 114, Fig. 3, actuated by a hydraulic eject cylinder and piston 115.

The piston and cylinder 115 are actuated by operating a single-pole double-throw switch 116, see Fig. 6, by a screw 99 of the tube carrier 34 as the latter complete an advancing movement. A circuit closed by the actuated switch 116 operates through the usual solenoid valve (not shown) the piston and cylinder 115 to advance the plunger 114 downward, as viewed in Fig. 3 (actually the movement is horizontal), thereby causing the plunger to transfer a filled tube 25 from the carrier 34 to the transfer dial 101. The advancing movement of the plunger 114 opens a switch 117, Fig. 3, which deenergizes a cocking or holding relay 118, also controlling the actuation of the eject piston and cylinder 115. When the cocking relay 118 is deenergized by opening of the switch 117 it breaks the circuit which was closed by the switch 116, and this results in the piston and cylinder 115 retracting the plunger 114.

The relay 118 includes a holding circuit so that once it is deenergized by opening of the switch 117 it will not automatically be again energized by closing of the switch 117. Thus the plunger 114 will remain retracted until the relay 118 is again cocked, and this can only occur upon actuation of the switch 116, Fig. 6, by movement of the tube carrier 34, to enable another circuit controlled by said switch to be closed so as to effect energization of the relay.

Once the relay 118 is energized, its holding circuit will keep it energized even though the switch 116 is again actuated upon the termination of the advancing movement of the tube carrier 34. Thus the movement of the tube carrier 34, through the switch 116, effects automatic advance and retraction of the plunger 114 only once for each stationary interval of the tube carrier, all in conjunction with the switch 117 and the holding or cocking relay 118. In other words, each time that the tube carrier 34 comes to rest the plunger 114 will be made to advance and retract, transferring a filled tube 25 to the dial 101.

Provision is made in the tube transfer dial 101 to cause automatic ejection of a transferred tube as a consequence of transfer of a subsequent tube from the carrier 34 to the dial. Referring to Figs. 3 and 5, the dial 101 is provided with a pair of slide pins or eject members 119 and 120 disposed at right angles to each other, the pin 120 being below the pin 119. Both pins are carried in diametric bores which communicate with the recesses 102 of the dial, being slidable in said bores and having a length such that they can project fully into one or the other of the opposite recesses 102 but not fully project into both recesses at the same time. Referring to Fig. 3, when a filled tube 25 is transferred by the plunger 114 from the tube carrier 34 to the dial 101 it will shift the pin 120 downward as viewed in this figure (actually horizontally) and cause the pin to project completely into the lowermost recess 102. This action will automatically eject from said recess any filled tube which has been carried by the recess and previously transferred to the dial from the tube carrier 34. The ejected tube will be deposited on the guide 28, and as succeeding filled tubes are ejected from the dial 101 they will be shifted along the guide 28 in a single line. Thus the filled tubes will be automatically ejected from the apparatus onto the guide 28, which constitutes the delivery point of the apparatus. Both rods 119 and 120 operate in the same manner, each being automatically positioned by the transfer of tubes to the dial 101 so as to be in readiness for subsequent transfer operations.

At the capping station 100 the dial 101 cooperates with a capping mechanism to apply caps or closures, such as the cap 26 shown in Fig. 19, to the filled tubes 25. Referring to Figs. 2, 3, 4 and 5 the caps 26 are brought from a suitable source of supply down an inclined chute 121, being disposed in upright positions in said chute. At the lower end of the chute 121 a slide member or plunger 122 is provided, actuated by a hydraulic cap-transfer cylinder and piston 123, the slide member having a concave end or extremity 124 adapted to engage a side of the cap 26. Cooperable with the slide 122 and disposed oppositely thereto in a spring-charged slide or plunger 125 having a concave nest 126 engageable with the opposite side of a cap.

Considering the cap chute 121 as being filled with caps and a cap as being deposited against an end abutment 127 of the chute, advance of the slide member 122 from right to left will cause the lowermost or end cap to be shifted into engagement with the concave nest 126 of the slide 125, and thereafter continued movement of the slide 122 will further shift the cap and the slide 125 an additional distance to the left, until the cap is directly over and centralized with respect to a filled tube carried in the dial 101. Because of the spring action of the slide 125 and the shape of the nests 126 and 124, the caps which are thus held over the filled tubes will be brought into a perfectly circular shape if they are not inherently so.

Referring to Figs. 2 and 5, a vertical plunger 128 is located so as to be disposed directly above a cap which has been transferred by the slide 122. The plunger 128 is operated by a hydraulic capping cylinder and piston 129 and upon descending it will transfer the cap held between the slides 122 and 125 downward and onto the filled tube carried in the dial 101. After such transfer the slide 122 and the plunger 128 are retracted respectively to the right and upward, whereupon the slide 125 may again advance toward the right, thereby resulting in the capping components assuming their initial positions. The caps in the chute 121 will, under the force of gravity, shift downward to present the next cap in line between the opposite nests 124 and 126 of the slides 122 and 125.

For the purpose of aligning the filled tubes as accurately as possible with the caps held between the slides 122 and 125, and to maintain the tubes prefectly circular even if they are not inherently so, an arcuate guide 130 is provided, closely fitting the peripheral surface of the dial 101 to retain the tubes fully seated in the recesses 102, and a ramp or cam member 131 acting as a support table is provided under the dial 101 for engagement with the bottoms of the filled tubes being transferred, thereby to slightly raise the tubes while they are being carried in the recesses 102. By the provision of the cam 131 an exact desired vertical positioning of the filled tube which is about to be capped may be had, since the height of the cam may be varied quite readily. Thus the mouth of the filled tube may be brought very close under the cap which is about to be transferred to it, minimizing the possibility of misalignment and jamming at this point. The movements of the slide 122 and the plunger or ram 128 are correlated with the operation of the machine in the following manner: The capping cylinder and piston 129 is actuated to advance and withdraw the plunger 128 simultaneously with the like movements of the ejector plunger 114, both the hydraulic units 129 and 115 being under the same control. Thus the capping of the filled tubes is accomplished while the tube transfer dial 101 is stationary, and simultaneously with transfer of a filled tube to the dial and ejection of a filled and capped tube from the dial. The piston and cylinder 123 is operated simultaneously with the hydraulic units 43 and 107 which respectively index or advance the tube carrier 34 and the tube transfer dial 101. Thus the cap transfer slide 122 is actuated simultaneously with turning movement of the dial 101 and advance movement of the tube carrier 34.

A safety mechanism is provided in the event that a filled tube on the carrier 34 is not ejected therefrom by the plunger 114 but instead allowed to remain in its nest 50. As shown in Fig. 3 a switch 133 is provided, connected so as to control the bin and chute vibrators 71 and 74. If a filled tube remains in its nest beyond the transfer station at which the plunger 114 is disposed, the presence of the tube will cause the switch 133 to be opened, thereby halting the vibrators and preventing the articles from being transferred to and filling the paddle wheel compartment 68. Thus the paddle wheel will not actuate the balance frame 62, and all further operations of the apparatus will be halted since they depend for their initiation upon descent of the paddle wheel after it has become filled with the desired quantity of articles.

The switch 133, in addition to deenergizing the vibrators 71 and 74, also opens the circuit of the solenoid 49 of the locking mechanism 44 which positions the tube carrier 34, and thus the tube carrier is maintained locked if a filled tube should get past the plunger 114. Such control may, for example, be conveniently effected through the use of a relay, as is well understood in the electrical art.

A further safety feature is provided in conjunction with the plunger 114. A switch 135 is mounted for engagement with the plunger when the latter is in retracted position, said switch being closed when thus engaged. This switch also controls the energization of the solenoid 49 of the locking mechanism 44, and whenever the plunger 114 is advanced the switch 135, being open, will prevent energization of the solenoid 49 and maintain the locking mechanism 44 operative to prevent any possible movement of the tube carrier 34. Thus jamming of the plunger 114 by the tube carrier 34 is prevented. A relay may be incorporated in this control circuit, as is well understood in the electrical art.

Fig. 20 is a chart showing the sequence and occurrence of various operations and functions of the apparatus, as described above. The interval of time from start to finish has been divided for convenience into eight equal subdivisions as shown by the broken lines, and may be considered as representing a cycle of the apparatus during which a tube is brought into the apparatus, articles are weighed and placed in another tube, a cap applied to still another tube which has been previously filled, and yet another tube ejected from the apparatus.

The hydraulic system for the apparatus utilizes relatively small cylinders and pistons, and when operating on approximately fifty pounds per square inch the piston power is in the neighborhood of thirty-five pounds. With such relatively small power units there is minimized the possibility of damage to the apparatus or to the articles or containers being worked with and also, which is more important, the possibility of damage to an operator who might be working around the machine and inadvertently become caught in the mechanism.

It will be understood from the above description that I have provided a novel and desirable automatic apparatus and improved method whereby small articles are measured out into predetermined quantities, deposited in packages and the packages thereafter capped and discharged at a delivery point.

Summarizing briefly the operation of the apparatus, the packages, in the form of the tubes 25, are automatically deposited on the endless carrier 34 by the plunger 56, Fig. 6. The packages 25 are then carried to the loading station 59, where they are loaded with predetermined quantities of the articles by the paddle wheel metering device 61 carried by the scale balance frame 62. The paddle wheel 61 automatically has one compartment filled, thereafter actuates the balance frame 62 which causes the wheel to be given a one-fifth turn, emptying its filled compartment into the funnel 60 which leads to the waiting tube 25 at the filling station. The operation of the paddle wheel is automatic, as effected by the balance frame 62 and indexing solenoid 81, whereby it continually meters or weighs the articles and thereafter dumps them into the funnel. The electronic timer 96 is activated in response to dumping of a quantity of articles by the paddle wheel 61, and this causes a slightly delayed advance of the tube carrier 34 to give material time to descend through the funnel and to bring the loaded tubes to the transfer and capping station 100, Figs. 1 and 3. At this station the loaded tubes are transferred to the dial 101, carried through a quarter revolution, capped by the plunger 128, carried through another quarter revolution and thereafter ejected and deposited on the delivery slide 28. All operations of the machine are fully automatic, and are under the control initially of the metering paddle wheel 61.

I have found that my apparatus is foolproof and reliable in its operation, effects a substantial saving in labor, and provides for a high degree of uniformity in the packaging of quantities of small articles. Various types and sizes of small articles may be handled by the machine, as for example, screws, nails, brads, tacks, glazier's points, nuts, etc. By virtue of the control exercised over the machine functions by the metering paddle wheel 61, the machine may be readily adapted to various types of articles without requiring any appreciable adjustment or alteration.

Variations and modifications may be made within the scope of the claims and portions of the improvements may be used without others.

I claim:

1. Apparatus for measuring and packaging quantities of small articles, comprising vibratory feed means for feeding continuously said articles from a source of supply to a stationary loading station; means at said station for collecting the articles into measured quantities and periodically dumping the measured quantities while beginning collection of a subsequent measured quantity, said means including a rotatably mounted paddle wheel having compartments which are consecutively loaded with the articles, with the compartments being formed by outwardly extending portions so that the wheel has a normal, loading position wherein the outermost portion of one partition is disposed at the top of the wheel placing the compartment being loaded at one side of the axis of the wheel and means periodically imparting a turning movement to the wheel through part of a revolution; carrier means for transporting open packages one after another to said stationary loading station to receive said dumped quantities; and a delayed-action motive means controlled by said collecting means and triggered substantially concurrently with dumping of a quantity of articles, for causing a delayed, advancing movement of the carrier means, said movement occuring after a package has been loaded with said dumped articles, thereby to present another open package at the loading station for loading with a subsequent quantity of articles.

2. The invention as defined in claim 1 in which there is a balance scale on which the paddle wheel is rotatably mounted, and in which the means imparting turning movement to the paddle wheel is responsive to movement of the balance scale and includes a solenoid, a camming driving connection between the solenoid and the paddle wheel and electrical contacts actuated by the balance scale and controlling the solenoid circuit.

3. The invention as defined in claim 2 in which there is a stop means operable to halt turning of the paddle wheel, said stop means being rendered operable by the solenoid alternately with said camming driving connection.

4. Apparatus for measuring and packaging quantities of small articles, comprising vibratory feed means for feeding continuously said articles from a source of supply to a stationary loading station; means at said station for collecting the articles into measured quantities and periodically dumping the measured quantities while beginning collection of a subsequent measured quantity, said means including a rotatably mounted paddle wheel having compartments which are consecutively loaded with the articles, with the compartments being formed by outwardly extending portions so that the wheel has a normal, loading position wherein the outermost portion of one partition is disposed at the top of the wheel placing the compartment being loaded at one side of the axis of the wheel and means periodically imparting a turning movement to the wheel through part of a revolution; carrier means for transporting open packages of the type adapted to be closed with caps, one after another to said stationary loading station to receive said dumped quantities, and for carrying loaded packages from said stationary loading station to a package-closing station; delayed-action motive means controlled by said collecting means and triggered substantially concurrently with dumping of a quantity of articles, for causing a delayed, advancing movement of the carrier means, said movement occurring after a package has been loaded with said dumped articles, thereby to present another open package at the loading station for loading with a subsequent quantity of articles; and means at said package-closing station, for applying caps to said loaded packages.

5. Apparatus for measuring and packaging quantities of small articles, comprising vibratory feed means for feeding said articles from a source of supply to a stationary loading station; means at said station for collecting the articles into measured quantities and periodically dumping the measured quantities; carrier means for transporting open packages of the type adapted to be closed with caps, one after another to said stationary loading station to receive said dumped quantities, and for carrying loaded packages from said loading station to a package-closing station; delayed-action motive means controlled by said collecting means and triggered substantially concurrently with dumping of a quantity of articles, for causing a delayed, advancing movement of the carrier means, said movement occurring after a package has been loaded with said dumped articles, thereby to present another open package at the loading station for loading with a subsequent quantity of articles; a support table at said package-closing station; means for shifting loaded packages from said carrier means to said support table; and means including a cap-engaging plunger at said package-closing station, for applying caps to said shifted, loaded packages as they are carried by the support table.

6. The invention as defined in claim 5 in which the package-shifting means includes a dial disposed adjacent the carrier means; having nests for receiving said packages, and in which the said support table is spaced from the carrier means, said dial shifting the packages received by it to the support table.

7. The invention as defined in claim 6 in which there is a delivery means for receiving packages from said dial, and in which there is an eject member movably carried by the dial and extendible into said recesses, said member being actuatable by a package being shifted into one nest of the dial, to eject from another nest a package which was previously shifted to the dial.

8. The invention as defined in claim 7 in which the dial has two pairs of opposite recesses disposed equidistant around the periphery, and in which there is a second eject member, said eject members comprising straight rods crossing one below the other and extending between the opposite recesses of the pairs.

9. The invention as defined in claim 6 in which there is a means for locking the dial in consecutively-advanced positions, in which there is a means for advancing the dial by predetermined amounts, and in which there is an unlocking means for rendering inoperative said locking means, said dial-advancing and unlocking means being activated substantially simultaneously with activation of the said motive means which causes movement of the carrier means.

10. The invention as defined in claim 9 in which there is means rendering inoperative said unlocking means after initial movement of said motive means.

11. The invention as defined in claim 6 in which the support table includes a cam means engageable with the packages for raising the latter to a predetermined height, and in which the cap-applying means includes a cap-shifting member movable in a path extending across the top of a shifted package, said member having a predeterminate spacing above said cam means.

12. The invention as defined in claim 6 in which the package-shifting means further includes an ejector plunger movable above and across the carrier means to transfer a package from the latter means to said dial, and in which there is a motive means for extending said plunger, operable in response to completion of advancing movement of said carrier means.

13. Apparatus for measuring and packaging quantities of small articles, comprising vibratory feed means for feeding said articles from a source of supply to a stationary loading station; means at said station for collecting the articles into measured quantities and periodically dumping the measured quantities; carrier means for transporting open packages one after another to said stationary loading station to receive said dumped quantities; delayed-action motive means controlled by said collecting means and triggered substantially concurrently with dumping of a quantity of articles, for causing a delayed, advancing movement of the carrier means, said movement occurring after a package has been loaded with said dumped articles, thereby to present another open package at the loading station for loading with a subsequent quantity of articles; means for locking the carrier means in consecutively-advanced positions; and means responsive to initial movement of said motive means, for rendering inoperative said locking means during advancing movement of the carrier means.

14. The invention as defined in claim 13 in which the carrier means includes a pair of endless sprocket chains disposed alongside each other, sprockets over which the chains pass, and nests connected on and between said chains, and in which the locking means includes a movably-mouted member engageable with the teeth of a sprocket to hold the same and the chains in various operative positions.

15. Apparatus for measuring and packaging quantities of small articles, comprising vibratory feed means for feeding said articles from a source of supply to a stationary loading station; means at said station for collecting the articles into measured quantities and periodically dumping the measured quantities; carrier means for transporting open packages of the type adapted to be closed with caps, one after another to said stationary loading station to receive said dumped quantities, and for carrying loaded packages from said stationary loading station to a package-closing station; delayed-action motive means controlled by said collecting means and triggered substantially concurrently with dumping of a quantity of articles, for causing a delayed, advancing movement of the carrier means, said movement occurring after a package has been loaded with said dumped articles, thereby to present another open package at the loading station for loading with a subsequent quantity of articles; and means at said package-closing station, for applying caps to said loaded packages, and in which the cap-applying means includes a pair of opposed plungers having oppositely-disposed end faces adapted to engage opposite sides of the caps, said faces being shaped to conform closely to a perfectly-formed cap, said plungers forcibly engaging the caps to hold the same to the correct shape and over the loaded package, said cap-applying means further including means for shifting the caps from between the plungers and onto the package.

References Cited in the file of this patent

UNITED STATES PATENTS

| | | |
|---|---|---|
| 1,989,039 | Geyer | Jan. 22, 1935 |
| 2,342,053 | Kinnebrew | Feb. 15, 1944 |
| 2,503,295 | Palmer | Apr. 11, 1950 |
| 2,613,905 | Muskat | Oct. 14, 1952 |
| 2,624,443 | Voller | Jan. 6, 1953 |
| 2,684,803 | Birkland et al. | July 27, 1954 |